July 18, 1967  O. ECKERLE ETAL  3,331,258
ROTOR FOR AN INTERNALLY OPERATING GEARED PUMP
Filed Jan. 21, 1965  2 Sheets-Sheet 1
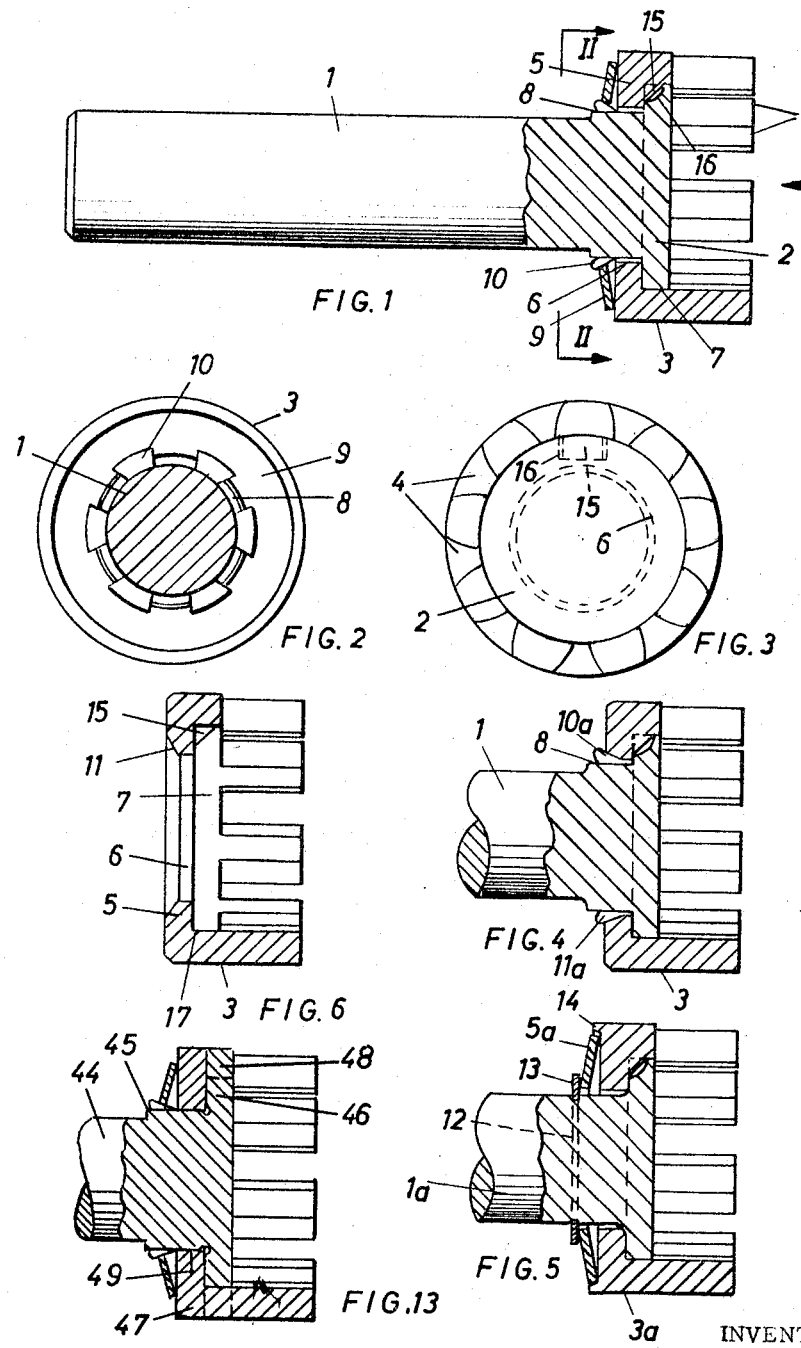
INVENTORS.
OTTO ECKERLE and HELMUT WEINZIERL.
BY *Otto John Henry*
ATTORNEY.

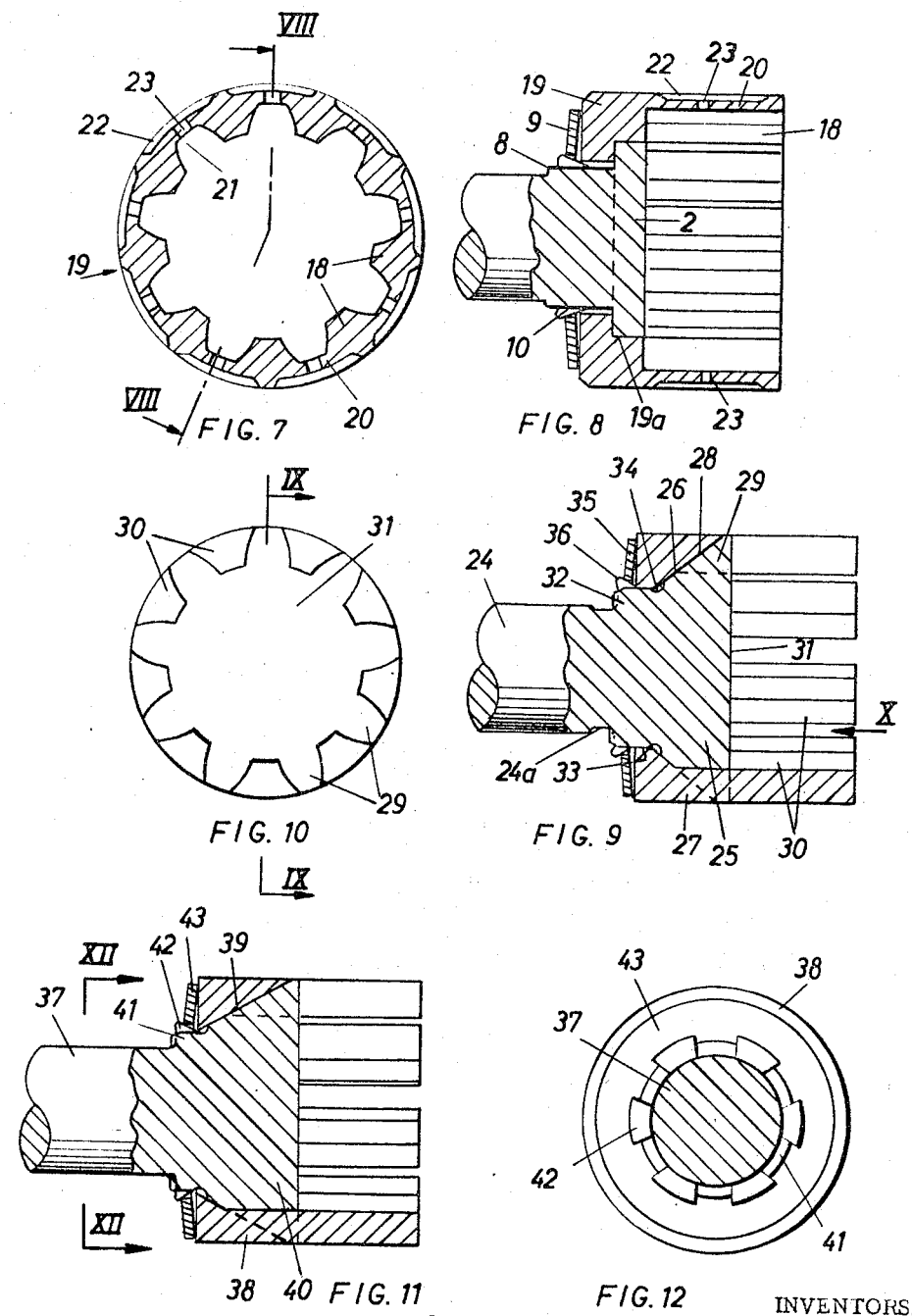

United States Patent Office 3,331,258
Patented July 18, 1967

3,331,258
ROTOR FOR AN INTERNALLY OPERATING GEARED PUMP
Otto Eckerle, Am Bergwald 3, Malsch, Kreis Karlsruhe, and Helmut Weinzierl, Rastatt, Germany, said Weinzierl assignor to said Eckerle
Filed Jan. 21, 1965, Ser. No. 426,841
Claims priority, application Germany, Feb. 17, 1964, E 26,417; Mar. 18, 1964, E 26,644
10 Claims. (Cl. 74—460)

ABSTRACT OF THE DISCLOSURE

A rotor for a gear pump has a shaft with an integral enlargement at one end. A spur gear has a central aperture through which the shaft extends, teeth at the periphery of the gear extending oppositely to the shaft, and a recess inwardly of the teeth which engagingly receives the enlargement of the shaft. The two parts are fixedly connected together.

Background of the invention

This invention relates to the construction of a rotor for an internally operating geared pump, in which a separate rotor gear is attached to a drive shaft.

In the prior art gear rotors for pumps of the type mentioned have been made by milling the teeth from a solid blank, followed by subdividing or cutting off one end portion of the milled blank. This procedure is complicated and expensive and yields unsatisfactory results and inaccurately cut teeth, because the milling cutter must pass twice through or over some of the tooth flanks. Furthermore, it frequently happens that the thin milling cutters necessarily used become deformed or break and result in inaccurately cut teeth. Again, in milling such pump rotors undesired grooves are formed on the inside surface of the closed end of the rotor which act unavoidably to impair the fluid seal between such end surface and the pinion in contact therewith. Finally, the prior art milling procedure just described results in teeth with straight or planar flanks whereas the present invention enables the production of tooth shapes resulting in pumps of much greater efficiency.

Summary of the invention

The invention comprehends a pump rotor which is formed in two parts rigidly and unitarily united into a functionally integral rotor. One of these parts is a driving shaft having an enlarged head integral with one end thereof, and the other part is a generally cup-shaped spur gear having a centrally apertured and recessed base for receiving the shaft and its head. Since the spur gear or wheel and its shaft are separately fabricated the gear can be manufactured without milling or cutting. For example it can be made simply, and with a high degree of accuracy by pressing or sintering processes. In this way the gear can be formed with tooth profiles of highly efficient shapes, such as involute.

Where gear pumps of the type involved operate at high pressures, the exposed teeth of the spur gear are subject to correspondingly high bending moments. These moments act to increase tooth friction and result in a relatively high rate of wear. As a further feature of this invention it is proposed to surround or encompass the teeth with a cylindrical or tubular jacket which is provided with shallow discrete recesses or depressions, one over the space between each consecutive pair of teeth, and a corresponding number of apertures through the wall of the jacket, each one extending from the bottom of a respective recess to the corresponding space between rotor teeth. By means of such a jacket the teeth are rigidly supported and interconnected against deflection under high pressure and the base or flange of the crown wheel is, at the same time, largely relieved of radial pressure.

In the manufacture of pump rotors in accordance with the invention, it has been found that a step-like transition from the base of the teeth to the centering recess in the base or bottom of the cup-like rotor, and within which the enlarged head of the shaft has a smooth fit, as well as a step-like transition from the aforesaid recess to the hole through which the shaft passes, results in air pockets during the pressing procedure; and that these air pockets result in inaccurate formation of the rotor part through the die.

In order to overcome these inaccuracies it is desirable to provide the base or bottom wall of the spur gear including the bases of the teeth with frusto-conical recesses, and to correspondingly shape the enlarged head of the drive shaft so that it fits smoothly within these recesses. By such a construction and procedure air can readily escape during pressuring and a highly accurate spur gear is produced. In all cases, the end surface on the enlarged head of the shaft is planar in a plane normal to the axis of the shaft and may be finished to a high degree of accuracy to provide a working surface for one face of the pump pinion. In some cases the construction and arrangement may be such that the spaces between teeth at the roots thereof are coplanar with the aforesaid end surface of the head upon the shaft. In other cases where a frusto-conical head is used, the surface of the gear between tooth roots may be formed as continuations of the frusto-conical recess in the base of the gear. Then the periphery of the frusto-conical head is notched or formed with "teeth" whose tips are flush with the exterior cylindrical surface of the gear. In such a construction the entire flat end face, or base, of the frusto-conical head forms a true highly accurate, and easily machined and polished working surface for the pinion.

The foregoing and other objects and advantages of the invention will be recognized by those skilled in the art after a study of the following detailed description, in connection with the accompanying drawing.

Brief description of the drawing

FIG. 1 is a longitudinal axial section through an assembled rotor constructed in accordance with the invention;

FIG. 2 is a section taken in a plane identified by line II—II, FIG. 1;

FIG. 3 is an end view of the spur gear looking in the direction of arrow III, FIG. 1;

FIG. 4 is an axial section corresponding to FIG. 1 but showing a modified means for connecting the spur gear to its shaft;

FIG. 5 is an axial section showing still another construction for attaching the rotor gear to its shaft;

FIG. 6 is an axial section showing a somewhat different form of central hole in the spur gear, for receiving the enlarged head of the shaft;

FIG. 7 is an end view of a rotor spur gear provided with an encompassing jacket as outlined in the foregoing objects;

FIG. 8 is a vertical axial section along the broken line VIII—VIII, FIG. 7, looking in the direction of the arrows;

FIG. 9 is a vertical axial section in a plane identified by line IX—IX, FIG. 10, looking in the direction of the arrows and showing still another form of the invention;

FIG. 10 is an end elevation looking in the direction of arrow X, FIG. 9;

FIG. 11 is a view corresponding generally to FIG. 9 but showing a somewhat different manner of coupling of the rotor gear to its shaft;

FIG. 12 is a transverse section in a plane identified by line XII—XII, FIG. 11, looking in the direction of the arrows; and FIG. 13 is a view corresponding to FIG. 9 but showing still another form of the invention.

Description of the preferred embodiments

Referring in detail to FIGS. 1, 2 and 3, the pump rotor comprises a shaft 1 which, as seen upon FIG. 1, has a cylindrical enlarged portion forming a circular step 8, followed by a circular head 2 of a diameter to fit the cavity of spur gear 3 having teeth 4 of involute form projecting forwardly from its base plate or bottom 5. Referring more particularly to FIG. 6, it is noted that the teeth do not extend all the way to the base plate 5, but, to the contrary, stop short thereof to define a cup-like recess 7 having an axial dimension the same as that of head 2, so that, when assembled, the surfaces between teeth 4 which are perpendicular to the axis of shaft 1 are coplanar with the outer flat surface of the head and lie therewith in a single plane normal to the axis of the shaft. The gear and shaft are connected for rotation as a unit, by a lug 15, FIGS. 1 and 6, at the junction between head 2 and the root of the cup-wall and which fits snugly within a mating slot 16 formed in head 2. Lug 15 is integral with gear 3.

In the form shown upon FIGS. 1, 2 and 3, the shaft and gear are rigidly connected against relative movement in the axial direction, by a dished spring washer 9 having a central aperture fitting smoothly over the enlargement forming shoulder 8, and a forwardly and outwardly extending periphery in contact with the outer surface of the gear. The washer is held in the position shown by staking or upsetting of the shoulder 8, either continuously or at uniformly circumferentially-spaced intervals, as indicated at 10, FIGS. 1 and 2, so that the spring acts continuously to urge the gear to the right relatively to shaft 1, as the parts are viewed upon FIG. 1 and thereby to hold it firmly seated against head 2.

The construction of the gear as shown in FIG. 4, differs from the one depicted in FIGS. 1, 2 and 3 chiefly in that the center hole in the gear 3 which fits over shoulder 8 of shaft 2 is beveled at its rear part at an acute angle as at 11a. The forward cylindrical surface 6 of the hole has a smooth fit on and about portion 8 and thus acts positively to center the gear on and with respect to the shaft, while the clearance between the shaft and beveled portion of the hole afford a space into which metal of the shaft may be upset, continuously or at uniformly-spaced intervals only, as at 10a, FIG. 4, to thereby stake the gear to the shaft rigidly and fixedly.

In the species of FIG. 5, the rear face of the gear has an axially-directed flange 14 about its periphery. The shouldered portion 8 of the species of FIGS. 1, 2 and 3 is omitted. A dished spring washer 5a has a central hole fitting the shaft and its periphery fits the recess formed in the gear by the aforesaid flange. The washer is held in the operative position shown by a spring ring 13 which snaps into a circular groove 12 in shaft 1a, positioned rearwardly of head 2a, and contacts the inner periphery of the washer. In all species shown in FIGS. 1 to 6 the lug and recess construction 15, 16, previously described, is used to prevent relative rotation of the gear on its shaft. Since the gear is accurately positioned coaxially of the shaft by cooperation between the cylindrical portion of the hole 6 and the shaft passing therethrough, the diameter of recess 7 in the spur gear, between the base or bottom wall thereof and a plane through the roots of the teeth, may be somewhat greater than the diameter of head 2. Or, in other words the construction shown does not require a high degree of precision between the two diameters. As a result of this costs of production of the rotor assembly are further reduced. It is also advisable to provide a fillet 17 at the circular junction between the inner surface of the base or bottom wall of the gear and the side wall thereof, as indicated in FIG. 6.

In the species of the invention shown upon FIGS. 7 and 8, the roots of teeth 18 of gear 19 are integral with a cylindrical jacket 20. The exterior surface of this jacket is formed with shallow uniformly circumferentially spaced depressions 22 extending over the space 21 between each respective pair of consecutive teeth. A hole 23 in the bottom of each depression 22 places the same in communication with the space between the corresponding pair of teeth. The recesses can also extend forwardly through the open or front part of the jacket and there connected or placed in communication with the space between teeth by way of radial grooves in the end surface of the jacket or, alternatively, by grooves in the pump casing. By such a construction the teeth are substantially relieved of bending moments at their junction with the base plate of the gear. In the modification being discussed the shaft 1 may be of the same general construction as in FIGS. 1 to 3, with shoulder 8. As shown, the inside bottom wall of the gear is formed with a circular coaxial recess 19a within which head 2 has a smooth fit. The axial dimensions of the recess and head are essentially the same, so that the end surface of the head is coplanar with the surface between teeth at the ends thereof. A dished washer 9 has a central hole fitting over shoulder 8 and is staked in place by uniformly circumferentially spaced upsets 10. As shown upon FIG. 8, the aforesaid shouldered portion 8 passes with substantial clearance through the central hole in the bottom wall of the gear. The gear may be fixed against rotation on and relatively to shaft 1 by the same lug and slot arrangement 15, 16, as in the species of FIGS. 1 to 3.

FIGS. 9 and 10 show a further important species wherein shaft 24 has a frusto-conical head 25 whose surface 26 expands outwardly and forwardly and terminates in a planar face 31 normal to the axis of the shaft. Between the conical head and the shaft proper there is a cylindrical enlargement or centering flange 32. The junction between this flange and the frusto-conical head is relieved by a circular channel 34.

The base or bottom wall of spur gear 27 is provided with a center hole 33 having a smooth fit over flange 32 and formed with a frusto-conical recess in its inner face complementary to the frusto-conical head and within which the head has a smooth accurate fit as is clear from inspection of FIG. 9. Teeth 30 extend in spaced parallel relation from the gear base. The recess in gear 27 is defined in part by inwardly and axially sloping pockets or grooves between the bases or root portions of each pair of contiguous teeth. Complementarily the periphery of head 25 is formed with circumferentially-spaced, axially-extending grooves or channels to form radial projections or "teeth" 29 each of which has a smooth accurate fit within the pocket between a respective pair of teeth, as is clearly shown upon FIG. 10. From this figure it is noted that the radial ends of projections 29 are flush with the outer cylindrical surface defined by teeth 30, so that surface 31 forms a continuous flat rotor bottom extending through the space between teeth to the outside surface of the gear. Furthermore, these projections 29 act positively to prevent rotation of the gear on and with respect to the shaft.

In the species being described, axial movement of the gear away from head 25 is prevented by dished washer 35 having a center hole fitting smoothly over and about flange 32 and an outer periphery bearing against the base of the gear. The washer is held in position by upsetting material of the flange, as indicated at 36, either continuously or at evenly-spaced intervals about the flange. It is contemplated also that flange 32 may be omitted, in which event hole 33 will be of reduced size to fit the shaft. Likewise in such case the hole in washer 35 will be reduced in size to fit the shaft. A circular channel such as 24a, FIG. 9, may be provided in the shaft, just to the rear of the washer, to provide a shoulder from which material of the shaft may be upset to secure the washer in place, as previously described. The species of FIGS. 11 and 12 is generally like that of FIGS. 9 and 10, except that flange 32 has been omitted. In order to achieve accurate centering of the gear upon and relatively to the shaft, the apex angle of the frusto-conical surface 39 of head 40 of shaft 37 is reduced from that of head 25. As shown in FIG. 11, the frusto-conical head extends to the center hole in gear 38, where it merges into a short cylindrical enlargement 41 of the shaft. The shoulder thus formed between the shaft and enlargement 41 facilitates upsetting 42, continuously, or, as shown, at spaced intervals, to stake or hold the dished washer 43 in position and the gear fixed upon the shaft.

In the species of FIG. 13 the shaft 44 has a cylindrical enlarged portion forming a circular step 45, followed by a circular head 46 of a diameter to fit the cavity of crown gear 47. The periphery of head 46 is formed with circumferentially-spaced, axially-extending grooves or channels to form radial projections or "teeth" 48 each of which has a smooth accurate fit within the pocket between a respective pair of teeth of the crown gear as is clearly shown upon FIG. 10. The base or bottom wall of crown gear 47 is provided with a center hole 49 having a smooth fit over circular step 45 or centering flange.

We have thus provided an internal spur gear pump rotor which fulfills all of the objects set forth. The two part construction by which the headed shaft and gear are separately and individually fabricated enables the gear to be manufactured by simple pressing or sintering procedures, and without milling or cutting. The shaft itself is formed by relatively simple machining and its end face is easily planed, ground and polished to a high degree of accuracy to form a surface against which an end face of the pinion rests. The invention also makes it possible to form teeth, such as involutes, having superior operating characteristics over the straight flank shapes to which milled teeth are restricted.

While we have disclosed the form of the invention presently preferred by us, numerous modifications, alterations, and substitutions of equivalents will readily occur to those skilled in the art, after a study of the foregoing specification. Consequently the disclosure should be taken in an illustrative rather than a limiting sense; and it is our desire and intention to reserve all changes, modifications, alterations and substitutions within the scope of the subjoined claims.

It is contemplated that a jacket such as 20, shown only in connection with the species of FIGS. 7 and 8 may also be provided for the other species herein disclosed.

Having fully disclosed the invention, what we claim and desire to secure by Letters Patent is:

We claim:

1. In a gear pump rotor, a shaft having an integral enlargement at one end thereof, a spur gear having a centrally-apertured base and uniformly-spaced teeth extending axially in parallel relation from the periphery of said base, there being an axially extending recess in said base inwardly of said teeth and coaxial of the aperture therein, said shaft passing through said aperture and said enlargement matingly engaging said recess, said teeth extending oppositely to said shaft, and means rigidly fixing said gear to said shaft.

2. The rotor of claim 1, the end face of said enlargement being planar and in a plane normal to the axis of said shaft and forming a working surface for said rotor.

3. The rotor of claim 2, said teeth having surfaces between them coplanar with said end face.

4. The rotor of claim 1, said enlargement and recess being cylindrical, a lug integral with the wall of said recess, and a slot in the periphery of said enlargement matingly receiving said lug.

5. The rotor of claim 1, said last-named means comprising a dished spring washer having a central aperture fitting said shaft and its outer periphery contacting said gear, the metal of said shaft being upset along its line of contact with said washer to stake the same in position.

6. The rotor of claim 1, said enlargement being frusto-conical and flaring outwardly and axially toward said one end of said shaft, said recess being frusto-conical in shape to receive said enlargement with a smooth fit.

7. The rotor of claim 6, the surfaces of said gear between teeth forming continuations of said frusto-conical recess, the periphery of said enlargement being notched to define radial projections fitting the surfaces of said gear between the teeth thereof, the end surface of said enlargement, including said projections, being planar in a plane normal to said axis, the radially outward tips of said projections being flush with and conjointly forming a cylindrical surface with the external surfaces of said teeth.

8. A gear pump rotor comprising a shaft having a first longitudinal axis, an enlarged head integral with one end of said shaft and symmetrical about said axis, a spur gear comprising a centrally-apertured base and a cylindrical jacket integral at one end with the periphery of said base and having a second axis of symmetry, uniformly-spaced parallel teeth integral with said jacket and extending radially inwardly from and longitudinally along the inner wall thereof parallel with said second axis, there being a recess in the inner wall of said base symmetrical about said second axis to receive said head with a smooth fit, and means rigidly fixing said shaft and gear together with said shaft extending through the aperture in said base and said head fitting within said recess with said axes in coincidence.

9. The rotor of claim 8, there being a plurality of shallow depressions in the external wall surface of said jacket, each said depression overlying the space between a consecutive pair of said teeth and a plurality of apertures in said jacket placing each said depression in communication with a respective one of said spaces.

10. In a spur gear for a pump rotor, a circular base plate, a plurality of teeth integral with and extending from the periphery of said plate parallel with the axis of said plate and in circumferentially-spaced relation, there being a central aperture through said plate coaxial of said axis and a recess in the inner face of said plate symmetrical about said axis, said recess being in frusto-conical form enlarged axially and outwardly, the surface between each contiguous pair of teeth being continuations of the frusto-conical surface of said recess.

References Cited

UNITED STATES PATENTS

| | | | |
|---|---|---|---|
| 2,189,100 | 2/1940 | Buckendale | 287—52.07 |
| 2,631,461 | 3/1953 | Duxbury | 74—230.4 |
| 2,750,850 | 6/1956 | Wildhaber. | |
| 3,184,988 | 5/1965 | Osplack et al. | 74—462 X |
| 3,203,268 | 8/1965 | Manoni et al. | 287—52.07 X |

DONLEY J. STOCKING, *Primary Examiner.*

DAVID J. WILLIAMOWSKY, *Examiner.*

L. H. GERIN, *Assistant Examiner.*